United States Patent

[11] 3,555,184

[72] Inventor Ray C. Townley
Middletown, N.J.
[21] Appl. No. 405,536
[22] Filed Oct. 21, 1964
[45] Patented Jan. 12, 1971
[73] Assignee Bell Telephone Laboratories, Incorporated
New York, N.Y.
a corporation of New York

[54] DATA CHARACTER ASSEMBLER
11 Claims, 9 Drawing Figs.

[52] U.S. Cl. ..... 178/52
[51] Int. Cl. ..... H04l 5/24
[50] Field of Search ..... 178/50, 51, 52, 53, 53.1; 179/15ASYNC, 15; 178/88; 325/40, 321, 322; 340/172.5(Inquired); 343/201, 204

[56] References Cited
UNITED STATES PATENTS

| | | | |
|---|---|---|---|
| 3,229,259 | 1/1966 | Barker et al. | 179/15X |
| 3,288,928 | 11/1966 | Bartlett et al. | 178/50 |
| 3,305,639 | 2/1967 | Jongkind et al. | 179/15 |

*Primary Examiner*—Kathleen H. Claffy
*Assistant Examiner*—David L. Stewart
*Attorneys*—R. J. Guenther and Kenneth B. Hamlin

ABSTRACT: Incoming serial data from a plurality of lines dedicated to different signaling rates is arranged in parallel form by an assembler which scans the lines and applies the interleaved bits to parallel gate circuits. The gate circuits are enabled to pass the bits to delay line stores by a logic circuit which detects incoming character start elements and thereafter successively operates the gates when the active lines are sampled at the theoretical midpoint of each successive code element. The stores are then simultaneously read out to pass the elements of each data character, in parallel, to a register.

Figures 1, 8:
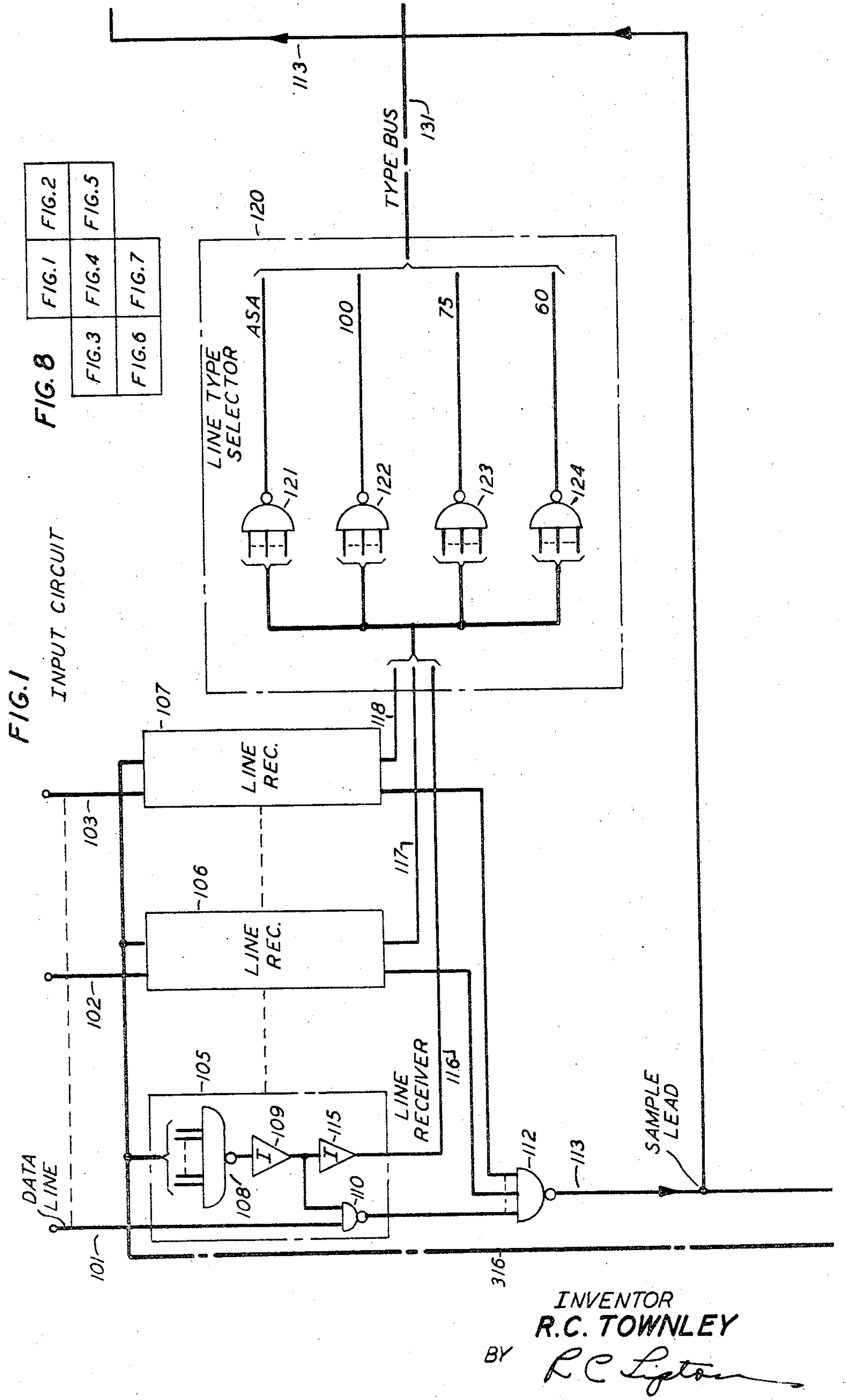

INVENTOR
R.C. TOWNLEY
BY R C Lipton
ATTORNEY

TRANSLATOR

ELEMENT STEERING AND PARALLEL STORAGE

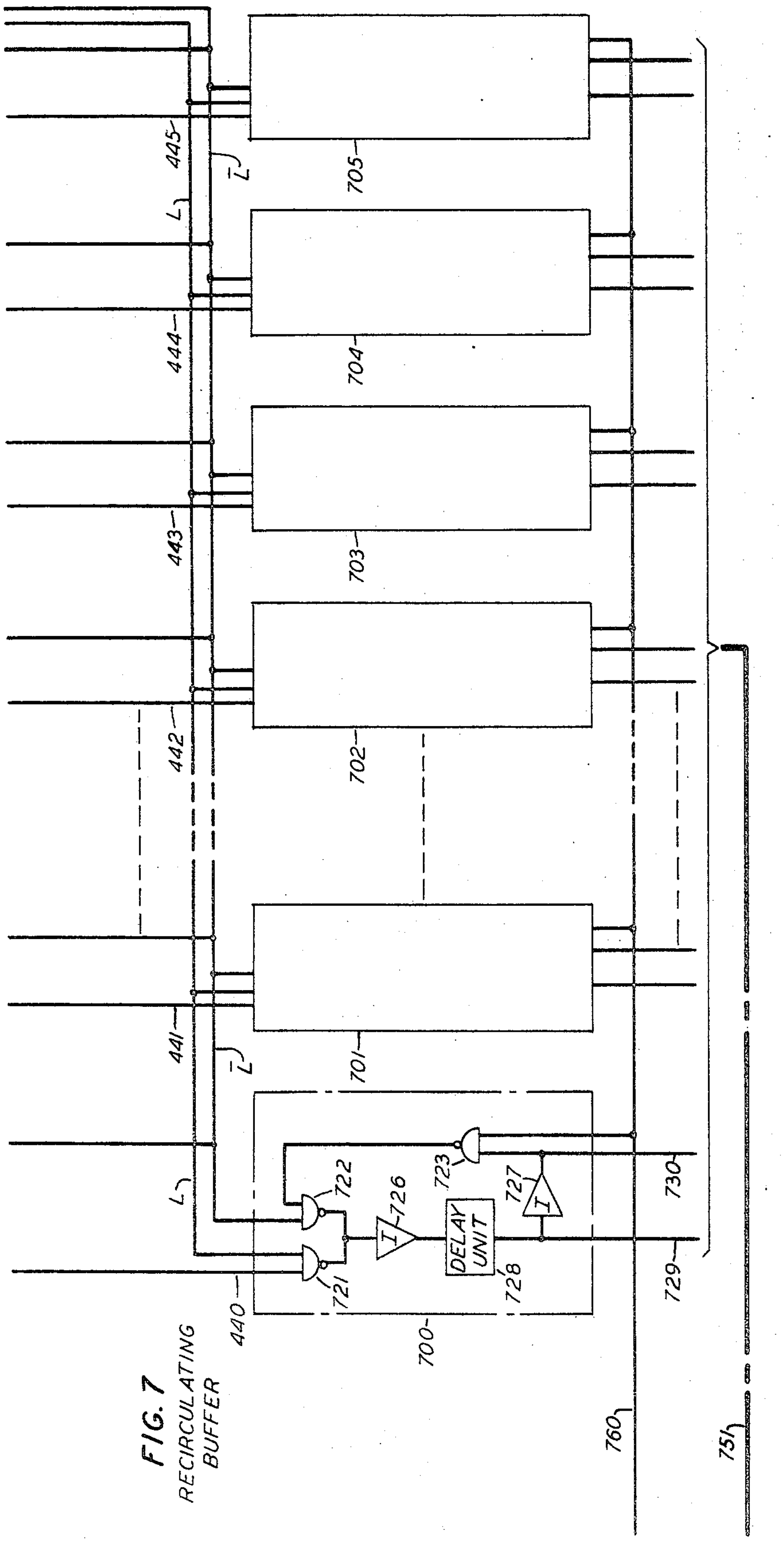
FIG. 7 RECIRCULATING BUFFER

DATA CHARACTER ASSEMBLER

This invention relates to a delay line assembler of data characters, and, more particularly, to incoming line data character assemblers suitable for electronic store and forward systems.

It is a broad object of this invention to provide an improved delay line assembler for data characters.

Electronic store and forward switching centers accept data messages from subscriber lines operating at various signaling rates, temporarily store the message, or blocks thereof, in a memory circuit and deliver the messages to appropriate outgoing lines in accordance with routing codes in the heading of the message. An input line unit is provided for incoming lines to assemble data characters on a bit-by-bit basis and send the assembled character bits together with address characters identifying the incoming line to the memory. Each incoming line may be dedicated to a start-stop code utilizing, for example, five or eight intelligence elements with a speed of 60, 75, or 100 words per minute. In accordance therewith, each incoming line is provided with an individual timing or counting circuit which operates at a speed compatible with the line signaling speed to produce timing pulses to scan the center of each code element and distribute the bits scanned thereby in a storage circuit until a complete character is assembled. The element bits thus assembled are then transmitted in parallel to memory.

Accordingly, it is an object of this invention to assemble data characters received from a plurality of lines dedicated to different signal rates.

It is another object of this invention to reduce the hardware dedicated to each incoming line.

It is a further object of this invention to share a common distributing and storage circuit among lines dedicated to different signaling rates.

In accordance with the illustrative embodiment of this invention disclosed herein, line scanner sequentially samples all incoming lines during each cycle thereof, the cycling rate being substantially greater than the highest signaling rate whereby each signal element is sampled a plurality of times. The interleaved bits thus obtained from all the lines are applied to parallel to a plurality of element steering gates which are successively enabled to distribute the code element bits in a plurality of parallel storage circuits. Thereafter, the data bits are sent by way of a buffer and an intermediate register to a memory circuit.

It is a feature of this invention to enable the steering gates at the midpoint of each code element and concurrently with the sampling of the data line conveying the signals whereby gates common to all the lines select only the interleaved bits derived from the sampling of the data line at the element midpoints and steer them to the parallel storage circuits.

It is another feature of this invention to recirculate the element samples in the storage circuits by way of a delay circuit having a delay equal to the duration of the scanner cycle and thus corresponding to the interval between the successive samples of an incoming line. The element samples of one line may thus be simultaneously read out in parallel from the storage circuits.

Figure 2:
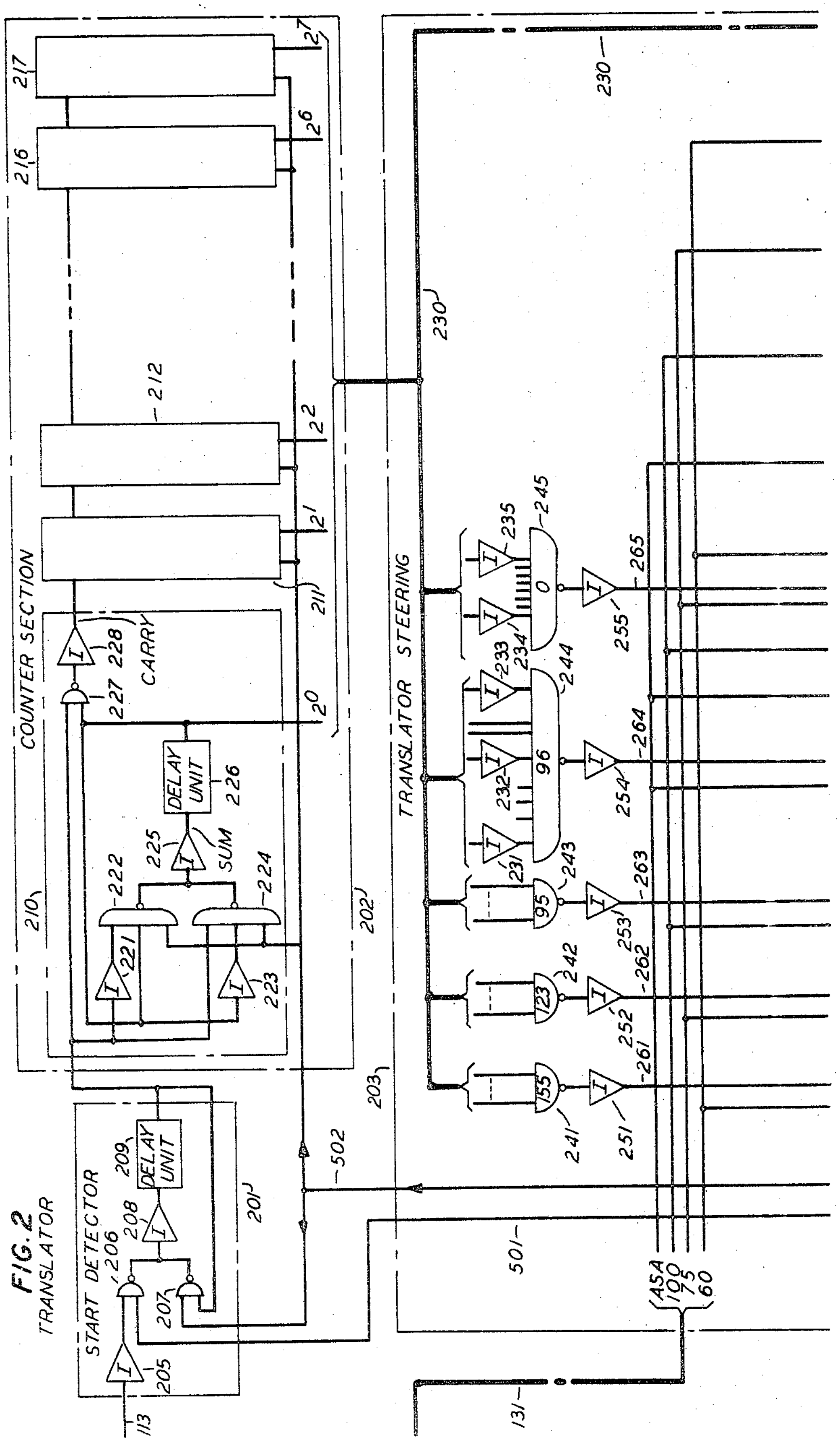
Figure 3:
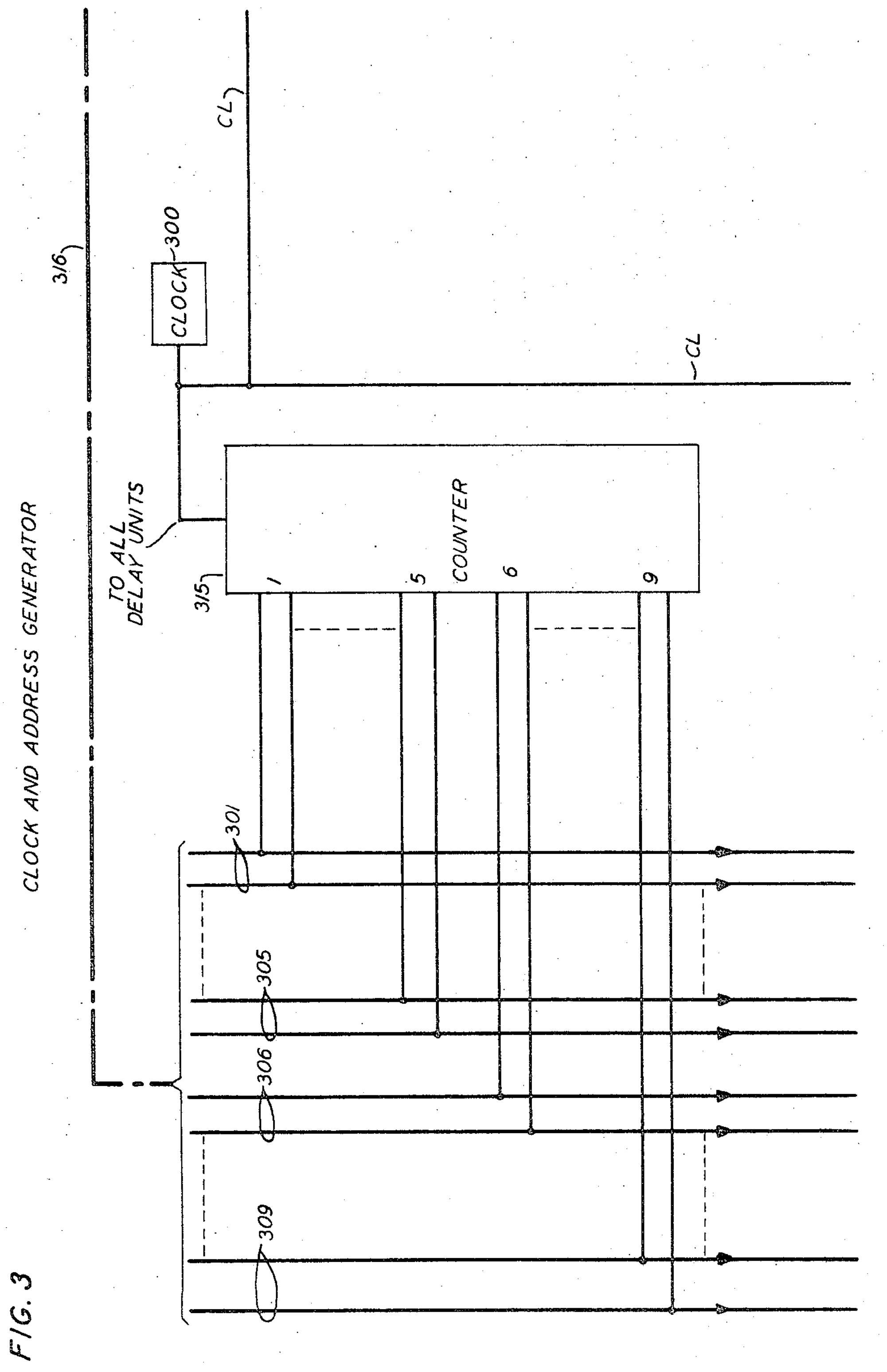
Figure 4:
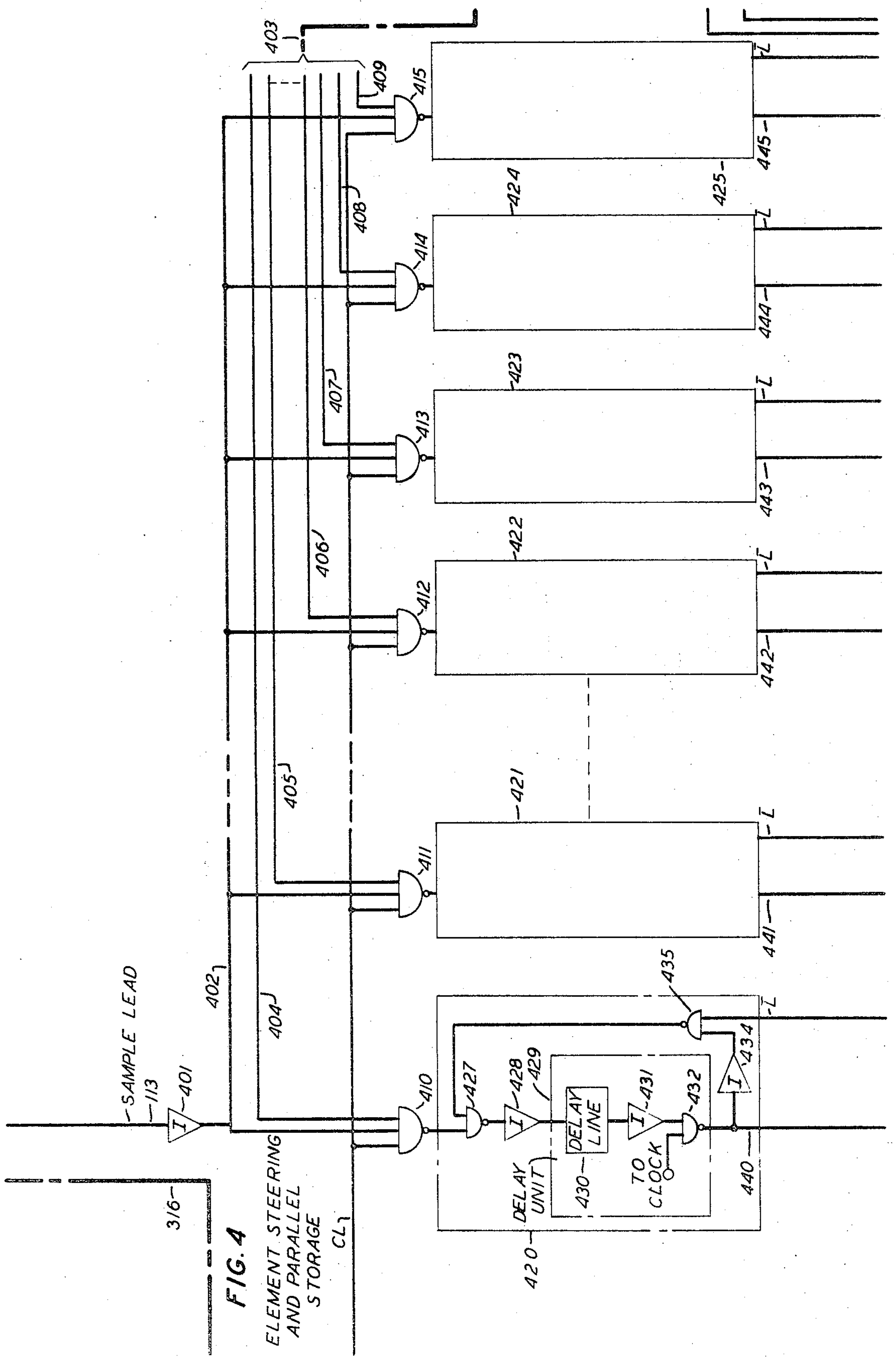
Figure 5:
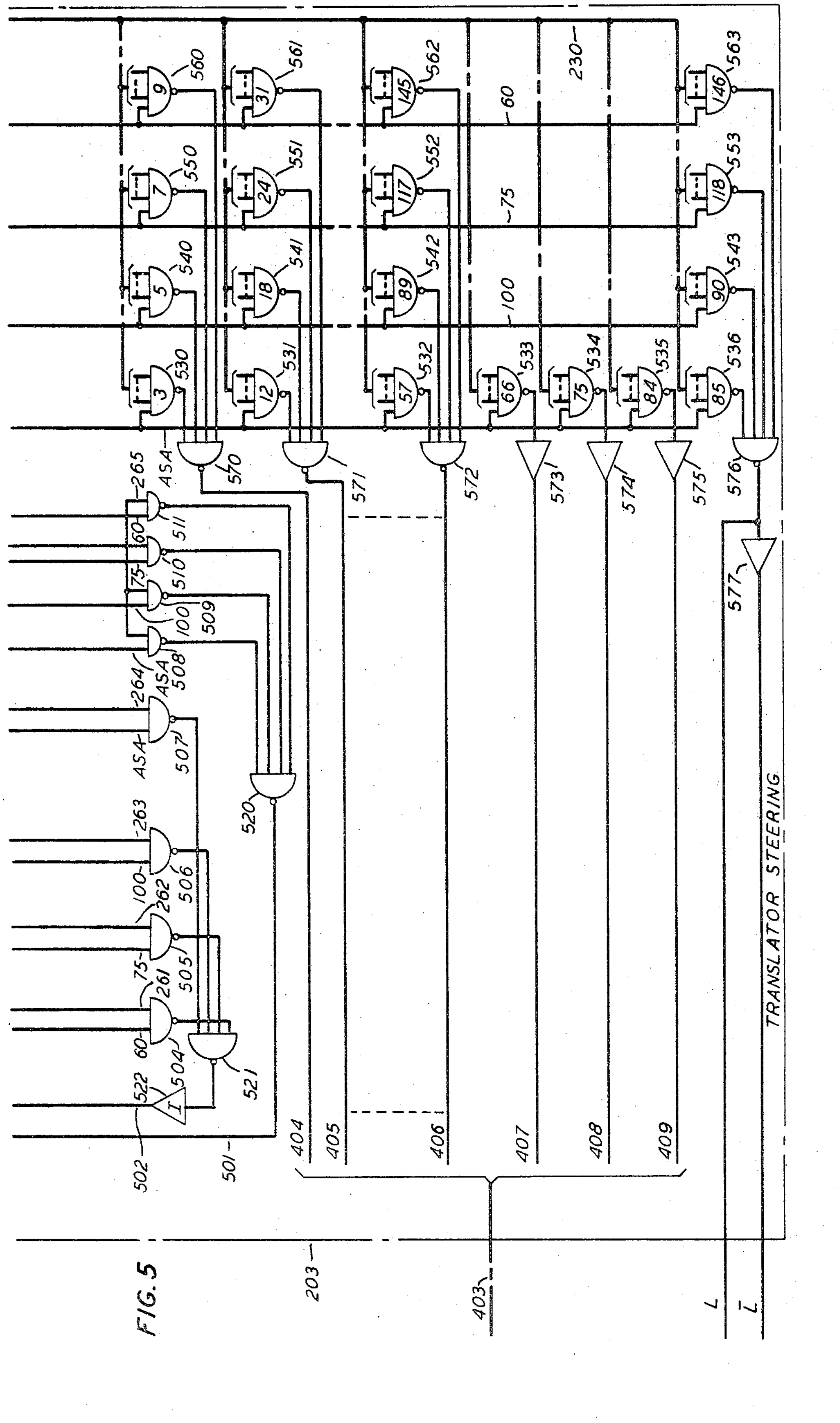
Figure 6:
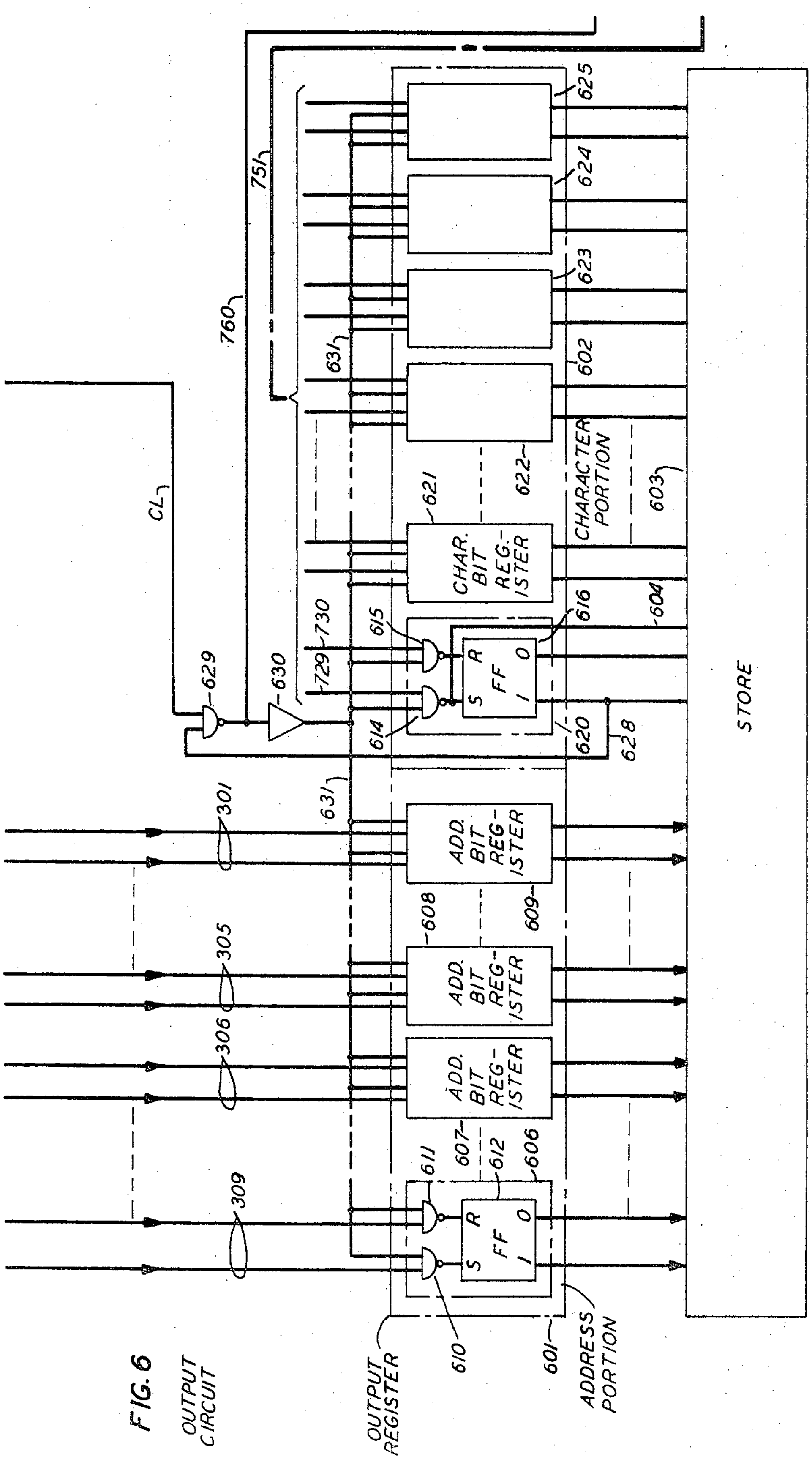

The foregoing and other objects and features of this invention will be more fully understood from the following description of an illustrative embodiment thereof taken in conjunction with the accompanying drawings wherein:

FIG. 1 shows incoming lines and associated line sampling circuits;

FIG. 2 together with FIG. 5 shows a counting circuit and associated translator steering circuit for determining the appropriate intervals for enabling the steering gates;

FIG. 3 shows an address generator circuit which controls the sequential operation of the line sampling circuits;

FIG. 4 discloses the steering gates and parallel recirculating storage circuits;

FIG. 6 shows an output register connected to the input of a memory circuit;

FIG. 7 discloses a buffer circuit which reads out the data from the recirculating storage circuits and thereafter passes the data to the output register;

FIG. 8 discloses the arrangement of FIGS. 1 through 7; and

Figure 9:
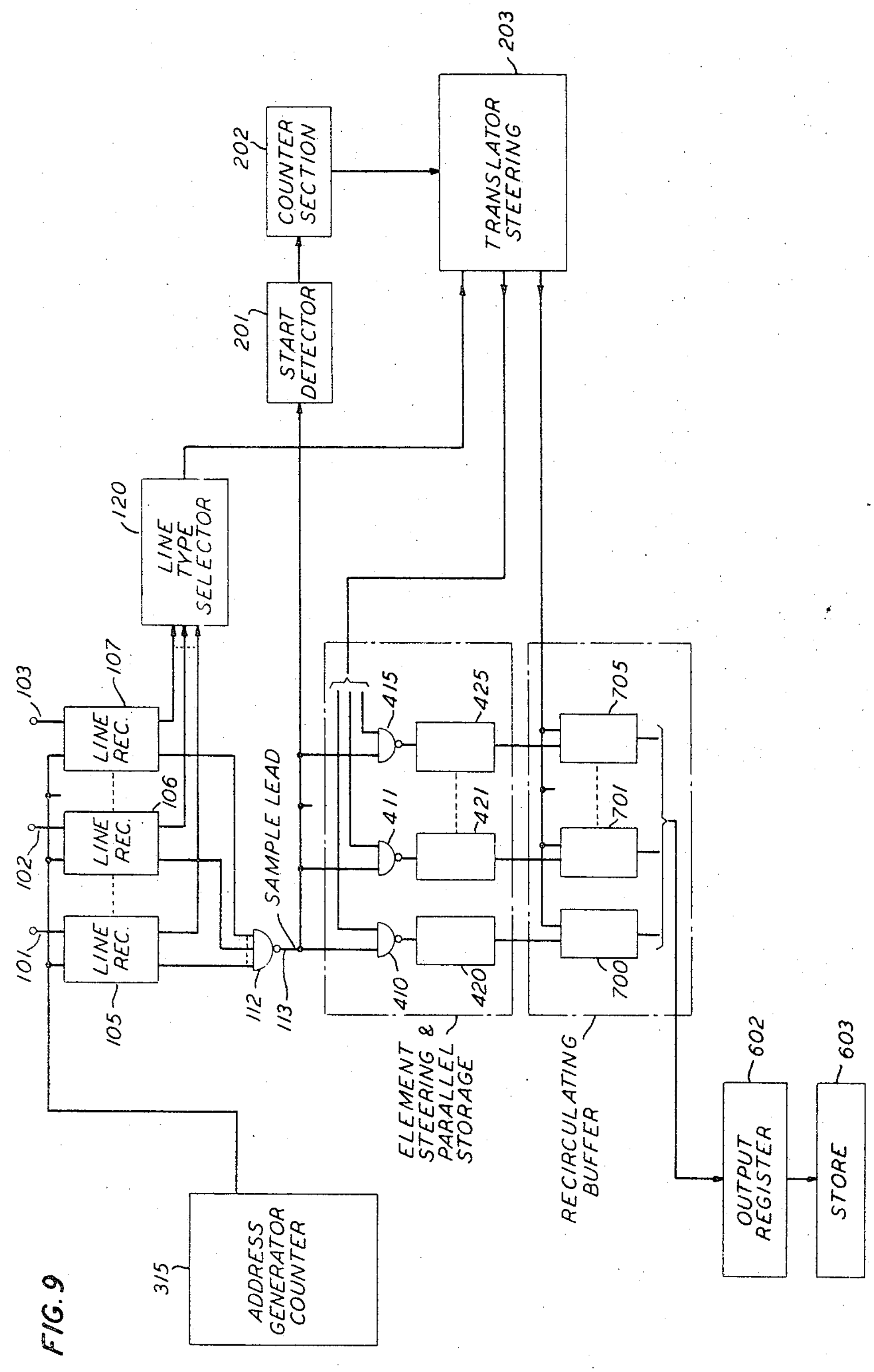

FIG. 9 discloses in block form the general arrangement of the delay line assembly.

GENERAL DESCRIPTION

The components of the delay line assembly are generally shown by referring to FIG. 9. These components are similarly identified in FIGS. 1 through 7. The following general description is directed towards FIGS. 1 through 7. The components in the general description, however, can also be identified by referring to FIG. 9.

Incoming data lines 101 through 103 represent the incoming lines to be sampled. In accordance with the embodiment herein disclosed 512 lines may be accommodated. Each of incoming lines 101 through 103 is dedicated to one of several start-stop data codes having one of several data speeds, as disclosed in detail hereinafter.

Sequential line scanning is provided by an address generator, principally including counter 315, FIG. 3, and a line receiver comprising line receivers 105 through 107, FIG. 1. In particular, counter 315 is arranged to advance through a plurality of counts, each count corresponding to one of line receivers 105 through 107. At each count a particular one of the line receivers is thus addressed whereby the line receiver samples the incoming data line extending thereto, passing the sample through gate 112, FIG. 1, to common bus sample lead 113. At the same time, the line receiver signals line type selector 120. This indicates the sampling of a data line having the predetermined code and signaling speed to which the data line is dedicated. It is noted that counter 315 sequentially addresses all line receivers and thus samples all incoming lines at a cycling rate which is substantially greater than the highest signaling rate of any line. Thus, each signal element on each line is sampled a plurality of times.

The sampled bits passed to sample lead bus 113 are applied in parallel to element steering gates 410 through 415, FIG. 4. In accordance with the present invention, element steering gates 410 through 415 are enabled when a data line sample is obtained at the theoretical midpoint of a code element passing the sampled bit to a corresponding one of parallel storage circuits 420 through 425, FIG. 4. Specifically, element steering gate 410 is enabled when the theoretical midpoint of a start element on an incoming data line is sampled, element steering gate 411 is enabled when the theoretical midpoint of an incoming first element is sampled, etc. Accordingly, the sampled bits corresponding to the midpoints of successive code elements are passed to parallel storage circuits 420 through 425.

As described in detail hereinafter, parallel storage circuits 420 through 425 include recirculating delay lines therein, permitting the simultaneous storage of a data character from each of the incoming lines. The elements of each data character are simultaneously read out and passed to buffers 700 through 705, FIG. 7. Thereafter, the character is applied to memory store 603 by way of register 602, FIG. 6.

The function of enabling element steering gates 410 through 415 at the theoretical midpoint of character elements, together with reading out the character from parallel storage circuits 420 through 425 to recirculating buffers 700 through 705, is provided by a translator circuit, generally shown in FIGS. 2 and 5, in conjunction with line type selector 120. The translator circuit generally comprises start detector 201, counter section 202 and translator steering section 203.

Start detector 201 monitors sampling lead but 113 to detect when a start element appears on an incoming line. After this transition occurs, the first sampling of the start element enables start detector 201 to advance counter section 202. Each subsequent advance occurs upon each sampling of the active incoming line. Thus, counter section 202 informs translator steering section 203 of the number of samplings of the active incoming line that have occurred since the start element transition.

Translator steering section 203, in addition to monitoring the advance of counter section 202, also checks the specific code and speed of the incoming line as determined by line type selector 120. After a predetermined number of samples, translator steering section 203 enables element steering gate 410. This enabling occurs when the active incoming line is sampled at the theoretical midpoint of the starting element since translator steering section 203 is advised of the code and speed of the incoming line and is further advised of the number of samplings which have taken place since the start element transition.

In a similar manner translator steering section 203 enables the other steering gates at the theoretical midpoint of the code elements corresponding thereto. After all of the elements are stored in parallel storage circuits 420 through 425, translator steering section 203 provides a load signal to recirculating buffers 700 through 705 to readout parallel storage circuits 420 through 425.

ADDRESS GENERATOR

The address generator shown in FIG. 3 includes a binary counter, generally indicated by block 315, which counter is driven by clock 300. Clock 300 has a frequency rate of about 507 kilocycles per second, providing a pulse every 1.97 microseconds. Each pulse from clock 300 functions to advance binary counter 315 one step. In addition, the output of clock 300 is also provided to the element steering circuit and the output circuit and to all delay units, as described hereinafter.

Binary counter 315 includes nine binary stages, each stage providing a double rail output. In FIG. 3 double rail output leads 301, 305, 306 and 309 are shown extending from the outputs of binary stages 1, 5, 6, and 9, respectively, of counter 315.

The nine stages of binary counter 315 provide a 512 count or 512 time slots, each count or time slot designating the address for each of 512 incoming lines. Since the clock pulses occur every 1.97 microseconds, the lines are successively addressed at the 1.97 microsecond rate and all lines are scanned in a 1.01 millisecond scan period. Leads 301 through 309, which constitute the double rail outputs of binary stages 1 through 9 of counter 315, are multiplied through cable 316 to the input circuit in FIG. 1 to provide the successive addressing of the input lines, as described hereinafter. In addition, double rail output leads 301 through 309 extend to the output circuit, FIG. 6, to provide the registration of the line address, as described hereinafter.

LINE SAMPLING CIRCUITS

As previously described, 512 input data lines may be accommodated, lines 101, 102 and 103, FIG. 1, being typical of the data lines. Each data line is dedicated to convey a specific data code. In accordance with this embodiment, four start-stop codes are provided for, namely, Baudot 100 speed, Baudot 75 speed, Baudot 60 speed and ASA 100 speed codes. In the Baudot code, each character comprises a spacing start element, five intelligence elements, and a marking stop element, the start and intelligence elements having a duration of one unit and the stop element having a 1.42 unit duration. The unit duration of the Baudot 100, 75, and 60 speed codes are 13.47, 17.57 and 22.0 milliseconds, respectively. The ASA code character comprises a start element, eight intelligence elements and two stop elements, all elements in the 100 speed code having a duration of 9.09 milliseconds.

Each data line is terminated by a line receiver, such as line receiver 105, which terminates data line 101. Similarly, line receivers 106 and 107 terminate data line 102 and 103. Line receiver 105 includes gate 108 and extending to the input thereof is one lead of each of double rail leads 301 through 309. The strapping of the leads provides that when counter 315 addresses data line 101 all of the input leads to gate 108 are in the high potential or 1 condition. Accordingly, if line 101 is not being scanned, at least one lead has a 0 bit applied thereto and the output of gate 108 provides a 1 bit. This is inverted by inverter 109, applying a 0 bit to gate 110, whereby the output thereof is in the 1 condition when the line is not being addressed. The output of inverter 109 is also applied to inverter 115 which applies a ! bit to lead 116 when data line 101 is not being scanned.

When counter 315 addresses data line 101, a 1 bit is applied to each of the input leads to gate 108, resulting in a 0 bit at the output of the gate. This 0 bit is inverted by inverter 109, and the consequent 1 bit is applied to gate 110. If data line 101 is in the marking condition, thus also applying a 1 bit to gate 110, the output of the gate goes to the 0 condition. This 0 condition is applied to an input lead of gate 112, and with the one input lead in the 0 condition, the output of gate 112 goes to the high potential or 1 condition. This 1 bit is then passed by way of lead 113 to the element steering circuit in FIG. 4 and the translator in FIGS. 2 and 5, are described hereinafter.

In the event that a spacing signal is being received on data line 101, a 0 condition is applied to gate 110, resulting in the application of a 1 bit to gate 112. Assuming, at this time, that data line 101 is being addressed by counter 315, all other similar gates in the other line receivers have 0 bits applied thereto and consequently all input leads to gate 112 are in the 1 condition. Accordingly, this sampling of data line 101 results in the application of a 0 bit to lead 113, and then to the element steering circuit and the translator.

LINE TYPE SELECTOR

As previously described, the output of inverter 109 is also applied to inverter 115. Accordingly, when data line 101 is addressed, the 1 bit at the input to inverter 115 produces a 0 bit on lead 116. Conversely, when line 101 is not being addressed, inverter 115 provides a 1 bit on lead 116.

Leads 117 and 118 extend from line receivers 106 and 107, respectively, and in the same manner as previously described for lead 116, are provided with a 0 bit when the corresponding line is addressed, and a 1 bit when the line is not being addressed. Leads 116, 117 and 118 extend to the line type selector, generally indicated by block 120.

Line type selector 120 includes gates 121 through 124, wherein gate 121 is associated with data lines carrying ASA code and gates 122, 123 and 124 are associated with data lines carrying 100 speed, 75 speed and 60 speed Baudot codes, respectively. If data line 101 conveys ASA code, lead 116 is strapped to the input of gate 121. Similarly, in the event that data line 101 conveys 100, 75 or 60 speed Baudot code, lead 116 is strapped to the input of gate 122, 123 or 124. In the same manner, leads 117 and 118 and the corresponding leads extending from the other line receivers extend to gates 122 through 124 in accordance with the corresponding speeds or codes of the associated data lines.

As previously described, a 1 bit is provided to lead 116 when data line 101 is not being addressed, and conversely, a 0 bit is provided to lead 116 when the data line is addressed. Accordingly, assuming data line 101 is conveying ASA code and the line is being addressed, a 0 bit is applied to the input of gate 121, thereby producing a 1 bit on the output lead, which lead is designated ASA. Thus, lead ASA, which is normally in the 0 condition, has a 1 bit applied thereto when a data line conveying ASA code is addressed. In a similar manner, the output leads of gates 122, 123 and 124, when they are designated leads 100, 75 and 60, have a 1 bit applied thereto when a data line conveying the corresponding code is addressed. Leads ASA, 100, 75 and 60 are multiplied through cable 131 which extends to the translator shown in FIGS. 2 and 5.

ELEMENT STEERING AND PARALLEL STORAGE CIRCUITS

As previously described, the sampling of a mark signal on a data line provides a 1 bit to sample lead 113 and, conversely, the sampling of a space signal on the data line provides a 0 bit to lead 113. Referring now to FIG. 4, lead 113 is connected to inverter 401 and the output thereof is applied to lead 402. Lead 402, in turn, is connected to an input of ten element steering gates of which gates 410 through 415 are shown in FIG. 4. Accordingly, with inverter 401 interconnecting leads 113 and 402, the sampling of a mark element provides a 0 bit in parallel to all the element steering gates and the sampling of a space signal results in the application of a 1 bit to all the element steering gates.

Another input to all the element steering gates is provided by lead Cl which lead extends to the output of clock 300. Accordingly, element steering gates 410 through 415 may only be enabled concurrently with the application of a clock pulse which, in turn, coincides with the time slots when the data lines are addressed.

Referring now to gate 410, it is noted that the third input thereto extends to lead 404, which lead, in turn, is connected by way of multiple cable 403 to the translator. As described hereinafter, an enabling pulse is applied to lead 404 after a start element transition is received and concurrent with the sampling of the approximate midpoint of the start element conveyed by a data line. Since this sampling of the start element provides a 1 bit to lead 402 concurrently therewith, gate 410 produces a 0 bit at the output thereof which output corresponds to the sampling of the midpoint of the start element. The 0 bit, in turn, is passed to a storage circuit generally indicated by block 420.

As previously described, two inputs of gate 411 are connected to lead 402 and lead Cl in the same manner as the input connections to gate 410. The third input to gate 411, however, is connected to lead 405 which extends by way of multiple cable 403 to the translator. As described hereinafter, an enabling pulse is provided to lead 405 by the translator concurrently with the sampling of the approximate midpoint of the first intelligence element of the data character. Assuming the first intelligence element comprises a space signal, a 1 bit is applied to lead 402 concurrently with the enabling of lead 405 and gate 411 produces a 0 bit at the output thereof. This 0 bit is thus passed to storage circuit 421 which circuit is identical to storage circuit 420. In the event, however, that the first intelligence element comprises a marking signal, a 0 bit is applied to lead 402 concurrently with the application of the enabling signal to lead 405 thereby producing a 1 bit at the output of gate 411.

Similarly, during the scanning of the midpoint of each of the successive character elements, each successive element steering gate is enabled to pass the sample bit obtained thereby to the storage circuit connected thereto. For example, in the event that a Baudot code is being received the sampling of the stop element and the concurrent enabling of lead 406 passes a sample bit through gate 412. If an ASA code character is being received, gate 412 functions to pass the sampling of the midpoint of the sixth intelligence element. In a similar manner, with an ASA code being received, gates 413 and 414 pass the sampled midpoints of the seventh and eighth intelligence elements to storage circuits 423 and 424. The first stop element of the ASA character is then passed by way of gate 415 to storage circuit 425. Thus, it is seen that samples of the successive elements are applied by way of successive element steering gates to associated ones of the parallel storage circuits by enabling the steering gates concurrently with the sampling of the line conveying the data character.

Storage circuit 420 is typical of storage circuits 420 through 425 and the four storage circuits (not shown) intermediate to circuits 421 and 422. Included in storage circuit 420 are gates 427 and 435, inverters 428 and 434 and delay unit 429. Delay unit 429 includes delay line 430, which may comprise a magnostrictive delay line having a delay of 1.01 milliseconds, inverter 431 and gate 432. It is noted that the delay of delay line 430 is equal to the line scan interval. Accordingly, delay line 430 accommodates 512 1.97 microsecond time slots and upon the application of a bit corresponding to a sample of a data line to delay line 430 the output thereof is producing a bit individual to the data line time slot. Accordingly, upon the next subsequent addressing of the data line, the previously applied sample bit appears at the output of delay line 430.

In the initial condition, prior to the enabling of lead 404, gate 410 is applying a 1 bit to storage circuit 420 which 1 bit is thus passed to an input of gate 427. Simultaneously therewith and as described hereinafter, gate 435 is applying a 1 bit to the other input of gate 427. Accordingly, a 0 bit is produced at the output of gate 427 and inverter 428 consequently passes a 1 bit to delay line 430. Upon the next sampling of the data line, delay line 430 passes a 1 bit to inverter 431. This produces a 0 bit on one input to gate 432 and gate 432, in turn, provides a 1 bit at the output thereof. This 1 bit is simultaneously passed to output lead 440 and to inverter 434 whereby a 0 bit is applied to one input of gate 435. Accordingly, assuming the delay line is still idle, 1 bits are applied to each of the inputs of gate 427 whereby, as previously described, a 1 bit is again passed through delay unit 429. Accordingly, a 1 bit is recirculated through storage circuit 420 in the initial idle condition.

Assuming now that a start element transition is received on a data line and lead 404 is subsequently enabled during the sampling of the midpoint of the start element, gate 410 passes a 0 bit to gate 427, as previously described. Accordingly, gate 427 produces a 1 bit at the output thereof and inverter 428, in turn, passes a 0 bit to delay line 430. Upon the next sampling of the data line, delay line 430 passes a 0 bit to inverter 431 and inverter 431, in turn, applies a 1 bit to gate 431. Since the clock pulse is concurrently applied to the other input of gate 432, a 0 bit is simultaneously applied to output lead 440 and to inverter 434. Inverter 434 thus, in turn, applies a 1 bit to gate 435.

Other input to gate 435 comprises don't load lead $\overline{L}$. As described hereinafter, lead $\overline{L}$ extends to the translator which normally applies a 1 bit thereto and applies a 0 bit to lead $\overline{L}$ after the complete character is stored in storage circuits 420 through 425 and the character bits are read out. Accordingly, at this time, the 1 bit is applied to lead $\overline{L}$ and with inverter 434 applying a 1 bit to the other input of gate 435, a 0 bit is thus produced at the output thereof and passed to gate 427. Accordingly, gate 427 applies a 1 bit to inverter 428 and inverter 428, in turn, applies a O bit to delay unit 429. It is thus seen that, with 1 bits applied to lead $\overline{L}$, a 0 bit is recirculated through storage circuit 420.

Similarly, when the midpoint of the first intelligence element of the character conveyed by the data line is scanned, a 0 bit is recirculated through storage circuit 421 in the event that this element is a space signal. Conversely, if this element is a mark signal, gate 411 applies a 1 bit to storage circuit 421 and the storage circuit continues to recirculate a 1 bit therethrough. In the same manner, the sampled element bits are placed in the other storage circuits and recirculated therethrough.

When the complete character is stored in the parallel storage circuit and subsequently read out, as described hereinafter, a 0 bit is applied to lead $\overline{L}$ concurrent with the sampling of the data line. Accordingly, gate 435 applies a 1 bit to gate 427. Since, at this time, an enabling pulse is not being applied to lead 404, gate 410 also applies a 1 bit to gate 427. This produces a 0 bit at the output of gate 427 and inverter 428, in turn, applies a 1 bit to delay unit 429. Accordingly, a 1 bit is again recirculated through storage circuit 420 returning it to the initial idle condition. In a similar manner, with lead $\overline{L}$ extending to each of the gates in storage circuits 421 through 425 corresponding to gate 425 in storage circuit 420, 1 bits are reinserted in storage circuit 421 through 425 to return them to the initial idle condition.

TRANSLATOR

The translator includes a start detector, generally indicated by block 201, FIG. 2, a counter section, generally indicated by block 202, and a translator steering section, generally indicated by block 203 and shown in FIGS. 2 and 5. Start detector 201 functions to recognize the start element transition bit obtained from sample lead 113 and initiate the generation of a pulse train for application to counter section 202. Counter section 202 counts the pulses provided by start detector 201 and provides the count to translator steering section 203. Translator steering section 203 translates the count under control of line type selector 120, providing reset signals to start detector 201 and counter section 202 and determines the appropriate intervals for enabling the element steering circuit to gate the bits on lead 113 and for reading out the parallel storage circuits.

START DETECTOR

Start detector 201 is provided with delay unit 209 which is similar to delay unit 429 and has a delay of 1.01 millisecond corresponding to the line scan interval. In the initial condition, a 1 bit is normally applied to lead 502 from translator steering section 203 and thus to one input of gate 207, the other input of gate 207 being connected to the output of delay unit 209 which is normally providing a 0 bit. Thus, gate 207 applies a 1 bit to inverter 208, which, in turn, passes a 0 bit to the input of delay unit 209. Accordingly, start detector 201 is recirculating the 0 bit which bit appears at the output of the delay unit 209 and is applied to the input thereof concurrently with the addressing of an individual data line. Similarly, 0 bits corresponding to time slots of other idle data lines are recirculating through start detector 201, appearing at the output when the corresponding line is addressed. In addition, lead 501 from translator steering section 203, which lead extends to gate 206 from start detector 201, is normally in the 1 condition.

Prior to the reception of the start pulse transition on lead 113 which indicates the start of a character on a data line, lead 113 has 1 bits applied thereto each time the data line is addressed, since the data line was in the idle marking condition or the stop element of the previous character was being sampled. This sampled 1 bit is applied to invert 205, which, in turn, applies a 0 bit to gate 206. A 1 bit is therefore produced at the output of gate 206 and since, as previously described, a 1 bit is also produced at the output of gate 207, inverter 208 continues to apply a 0 bit to delay unit 209. Accordingly, concurrently with the addressing of the data line, delay unit 209 passes a 0 bit to counter section 202 and to gate 207. This 0 bit does not function to advance counter section 202 and the translator remains in the same condition.

When a start pulse transition is received and the line is sampled, a 0 bit is applied to lead 113, which bit is inverted by inverter 205 to apply a 1 bit to gate 206. Since lead 501 normally has a 1 bit applied thereto, the output of gate 206 produces a 0 bit and inverter 208, in turn, applies a 1 bit to delay unit 209. Accordingly, when the data line is addressed during the next subsequent line scan period, a 1 bit appears at the output of delay unit 209 and is applied to counter section 202 and gate 207. As described hereinafter, the application of the 1 bit to counter section 202 results in the advance thereof and the application of a 0 bit to lead 501 during subsequent time slots individual to the data line. This produces a 1 bit at the output of gate 206 terminating the response of the gate to bits on lead 113. In addition, the application of the 1 bit to gate 207, with a 1 bit applied to the other input by lead 502, provides a 0 bit at the output thereof which is converted to a 1 bit by inverter 208 and applied to delay unit 209. This bit, with a 1.01 millisecond delay, is thus recirculated to provide a train of 1 bits at the output of start detector 201, each bit spaced 1.01 milliseconds apart and thus occurring as the data line is successively addressed. Similarly, a detected start transition from any other line provides a train of 1 bits concurrently with the addressing of the line and interspersed with the bit trains associated with other lines receiving data.

COUNTER SECTION

Counter section 202 includes eight counter stages of which counter stages 210 through 212 and 216 through 217 are shown. Counter stage 210 is typical and similarly arranged as each of the other stages and includes delay unit 226, which delay unit is substantially identical to delay unit 209 and provides a delay of 1.01 milliseconds. In addition to delay unit 226, counter 210 includes an add-one or half-adder circuit which includes inverters 221, 223, 225 and 228 and gates 222, 224, and 227. The two inputs to the half-adder circuit comprise the output of start detector 201 and the output of delay unit 226. The sum output of the half-adder circuit is obtained from the output of inverter 225 and applied to the input of delay unit 226 and the carry output is obtained at the output of inverter 228. The function of the half-adder circuit is to apply at its sum output a o bit if the two input bits are both 0 or 1 and, conversely, provide a 1 at the output thereof if either one, but not both, of the input bits is 1. A 1 bit carry output is obtained if both input bits are 1.

Considering counter stage 210 in detail, the output of start detector 201 is applied to inverter 221 and to gate 224 in parallel. Accordingly, the input bit is applied to gate 224 and the inversion of the bit is concurrently applied to gate 222. The output of delay unit 226 is applied in parallel to gate 222 and inverter 223. Thus, the bit output of delay unit 226 is applied to gate 222 and the inversion thereof is concurrently applied to gate 224. The other inputs to gates 222 and 224 are connected to lead 502 which is normally in the 1 condition.

In the initial condition, the input to counter stage 210 and the output of delay unit 226 are in the 0 condition. Accordingly, during the time slot when a selected one of the data lines is addressed, a 0 bit is applied to each of gates 222 and 224. Thus, both gates provide a 1 bit at the output thereof, which is inverted by inverter 225 to a 0 bit and applied to the input of delay unit 226. Accordingly, a 0 bit sum is provided by inverter 225 and is recirculated through counter stage 210, appearing at the output of delay unit 226 during the time slot individual to the selected data line.

When start detector 201 detects a start transition, a pulse is generated at the output thereof, as previously described, and concurrently applied to inverter 221 and gate 224. Since the other input leads to gate 224 are at this time in the 1 condition, as previously described, the output of the gate provides a 0 bit resulting in a 1 bit sum at the output of inverter 225 and in the application of the 1 bit to delay unit 226. When the selected line is addressed during the next scan cycle, this 1 bit appears at the output of delay unit 226 and start detector 201 applies another 1 bit to inverter 221. Accordingly, inverter 221 applies a 0 bit to gate 222 and inverter 223 applies a 0 bit to gate 224. Accordingly, a 1 bit appears at the output of both gates and inverter 225 passes a 0 bit sum to the input of delay unit 226. In the third scan cycle, when the selected data line is again addressed, start detector 201 again generates a 1 bit and delay unit 226 provides at the output thereof a 0 bit. Accordingly, the above-described two step cycle is again repeated.

The carry output of counter stage 210 is provided through gate 227 and inverter 228. Gate 227 applies an o bit to inverter 228 when 1 bits appear at both the output of delay unit 226 and the input of counter stage 210, inverter 228, in turn, applying a 1 bit carry to the input of counter stage 211. Since, as previously described, concurrent 1 bits are provided by the output of delay unit 226 and the output of start detector 201 during the second scan cycle and each alternate ones of the subsequent successive scan cycles, a 1 bit carry is thereby applied to counter stage 211 during alternate scan cycles. It is, of course, recalled that this bit also occurs concurrently with the addressing of the selected data line.

Counter stage 211 is arranged in the same manner as counter stage 210. Accordingly, when the first bit is applied thereto during the second scan cycles, a 1 bit sum is obtained and thus applied to the delay unit therein. During the third scan cycle the delay unit thus provides, at the output thereof, a 1 bit. Counter stage 210, however, does not apply a 1 bit carry to counter stage 211 during the third scan cycle, as previously described. Accordingly, 1 bits are applied to each of the input leads of the gate in counter stage 211 corresponding to gate 222 in counter stage 210. Thus, during the third scan cycle, a 1 bit sum is again obtained and is recirculated back through the delay unit in counter stage 211. The delay unit in counter stage 211 therefore provides a 1 bit at the output thereof during the fourth scan cycle and with a 1 bit being provided by counter stage 210, a 0 bit sum is obtained and applied to the input of the delay unit. In addition, the concurrence of the 1 bit at the output of the delay unit with the 1 bit provided by counter stage 210 results in the application of a 1 bit carry to the output of counter stage 211. During the next four scan cycles, this process is repeated, an output carry bit being produced by counter stage 211 and provided to the input of counter stage 212 during every fourth scan cycle.

In a similar manner, counter stage 212 inserts a 1 bit through the delay unit therein in response to the reception of the 1 bit from counter stage 211 during the fourth scan cycle, recirculates the 1 bit until the next bit is received from counter stage 211 during the eighth scan cycle and thereupon passes a 1 bit to the next successive counter stage and terminates the recycling of the 1 bit. The operation of counter stage 212 is then repeated for the next eight scan cycles and for each of the eight scan cycles thereafter.

In a similar manner, each of the subsequent stages by virtue of the delay feedback, maintains a binary count or sum in response to carry outputs of the prior stage and provides a carry output to the subsequent stage when the prior stage carry and the binary sum are 1 bits. This provides the same function as a binary counter, the binary count being obtained at the sum outputs. Output leads $2^0$ through $2^7$ are obtained from the delay unit outputs, however. Accordingly, the count on leads $2^0$ through $2^7$ correspond to the count during the prior scan cycle. It is noted that these counts are obtained concurrently with the addressing of the selected data line. Similarly, if start detector 201 supplies 1 bits associated with other lines, these bits will be concurrently counted, the sum being obtained on leads $2^0$ through $2^7$ concurrently with the scanning of the associated line.

TRANSLATOR STEERING

Leads $2^0$ through $2^7$ extend in multiple through cable 230 to translator steering section 203. Translator steering section 203 includes a plurality of gates such as gates 241 through 245, which gates selectively respond to a predetermined count of counter section 202, in accordance with the manner in which each gate is coupled to leads $2^0$ through $2^7$. For example, gate 244 is enabled by the advance of counter section 202 to a count of 96. This is accomplished by connecting lead $2^0$ through inverter 231 to one input of gate 244, connecting lead $2^4$ through inverter 232, connecting leads $2^1$ through $2^3$ through inverters, not shown, connecting leads $2^5$ and $2^6$ directly and connecting lead $2^7$ through inverter 233 to the other inputs of gate 244. Accordingly to apply 1 bits to all of the inputs to gate 244 the binary count of the counter, wherein the least significant digit is designated last, comprises the number 01100000 which is equivalent to 96. Similarly, gate 245 is selectively connected for the number 0 since all of the output leads of counter section 202 are applied thereto through inverters, such as inverters 234 and 235. In addition, gate 241 is selectively strapped to respond to the number 123,and gate 243 is selectively strapped to respond to the number 95.

Recalling now that when the selected data line is in the idle condition, counter section 202 provides a 0 count concurrently with the addressing of the data line. This count functions to provide all 1 bits to the inputs of gate 245, as previously described. Accordingly, a 0 bit is produced at the output of gate 245, which bit is converted to a 1 bit by inverter 255 and applied to lead 265. Lead 265, in turn, extends to inputs of gates 508 through gate 511, FIG. 5. Assuming now that the scanned data line conveys ASA code, a 1 bit is also applied to lead ASA in line type selector circuit 120, lead ASA extending through cable 131 to the other input of gate 508. Accordingly, concurrently with the scanning of the idle ASA data line, gate 508 applies a 0 bit to an input of gate 520, and gate 520, in turn, thus applies a 1 bit to lead 501. Accordingly, in the initial idle condition 1 bits are applied by way of lead 501 to the input of gate 206 in start detector 201 concurrently with the scanning of the idle line.

Similarly, if the scanned idle line conveys 100 speed, 75 speed or 60 speed Baudot code, leads 100, 75 or 60 in line type selector 120 has a 1 bit applied thereto, which bit is thus applied to an input of gate 509, 510 or 511. Accordingly, the pulsed one of gates 509 through 511 provides a 0 bit to the output thereof, whereby gate 520 applies a 1 bit to lead 501.

In addition, with the count of counter section 202 at 0, at least one of the input leads to gates 241 through 244 has a O bit applied thereto. Thus, gates 241 through 244 apply 1 bits to inverters 251 through 254, respectively, thereby producing 0 bits on leads 261 through 264. Leads 261 through 264, in turn, extend to inputs of gates 504 through 507, FIG. 5, whereby all of the inputs to gate 521 have 1 bits applied thereto. Gate 521 thus applies a 0 bit to inverter 522 and the inverter passes a 1 bit to lead 502, which lead, as previously described, extends to an input of gate 207 in start detector 201, to inputs of gates 222 and 224 of counter stage 210, and to the inputs of corresponding gates in the other counter stages. Thus, in the initial condition, during the scanning of the selected line, 1 bits are normally applied to lead 502.

Recalling now that the detection of a start element transition initiates the generation of 1 bits by start detector 201 and advances the count of counter section 202, at least one of the inputs to gate 245 has a 0 bit applied thereto when this count is advanced. This provides a 1 bit to the output of gate 245, whereby inverter 255 applies 0 bits to gates 508 through 511. Accordingly, gates 508 through 511 apply 1 bits to gate 520 thereby producing a 0 bit on lead 501. Thus, as previously described, the output of gate 206 produces a 1 bit during each scan of the selected data line so long as the corresponding count of count 202 is not 0.

As disclosed previously, translator steering section 203 restores start detector 201 and counter section 202 to the initial condition while the terminal portion of the data character is being received by applying a 0 bit to lead 502 and reapplying 1 bits to lead 501. This operation takes place while the scanner is applying the bits corresponding to the terminal portion of the stop element to sample lead 113.

With respect to ASA data lines, the character terminates approximately 100 scanning periods after the start element transition. After 98 scanning periods, however, counter section 202 is advanced to the count of 96, thus enabling gate 244. Accordingly, a 0 bit is applied to inverter 254, thus passing by way of lead 264 a 1 bit to an input lead of gate 507. Since a 1 bit is being concurrently applied to lead ASA, gate 507 applies a 0 bit to gate 521. Accordingly, gate 521 passes a 1 bit to inverter 522 which, in turn, applies a 0 bit to lead 502.

With a 0 bit on lead 502, gate 207 in start detector 201 passes a 1 bit to inverter 208 regardless of the output of delay unit 209. This reinserts a 0 bit in delay unit 209, restoring start detector 201 to the initial idle condition. Concurrently therewith, lead 502 applies a 0 bit to inputs of gates 522 and 524 in counter stage 210. Accordingly, a 1 bit is produced at the outputs of these gates regardless of the input bit provided by start detector 201 or the feedback bit provided by delay unit 226. Thus, inverter 225 inserts a 0 bit into delay unit 206 and the binary sum provided by stage 210 in the time slot of the ASA line is restored to 0.

Similarly, lead 502 applies 0 bits to each of the gates corresponding to gates 222 and 224 in each of the other counter stages. Accordingly, the counts in the other stages are restored to 0 in the same manner. Thus, with the recirculating bit removed from start detector 201 and the count of counter section 201 restored to 0, these circuits are restored to the initial idle condition, awaiting the next start pulse transition. With the count of counter section 202 restored to 0, gate 245 is again enabled and a 1 bit is reapplied to lead 501, as previously described. Gate 206 is thus enabled to respond to a start bit transition when it is received from sample lead 113.

In a similar manner, gates 241 through 243 enable inverters 251 through 253 to pass 1 bits to gates 504 through 506 when the count of counter section 202 reaches 155, 123, and 95, respectively. In the event that a 60, 75, or 100 speed line is being scanned, gates 504, 505 or 506 apply a 0 bit to gate 521. Accordingly, a 0 bit is applied to lead 502 to restore start detector 201 and counter section 202, as previously described. It is thus seen that as lead 113 supplies the terminal portion of the stop element, the count is restored to 0 and start detector 201 again looks for the start pulse transition.

Gates 530 through 535, 540 through 542, 550 through 552 and 560 through 562 of translator steering section 203 detect the cycle counts which determine the appropriate intervals for enabling element steering gates to apply the element bits to the parallel storage circuits. Gates 530 through 535 determine the appropriate intervals for characters received on ASA lines, one input of gates 530 through 535 being connected to lead ASA and the other inputs thereof selectively connected by way of multicable 230 to the counter section 202 output leads. Similarly, gates 540 through 542 determine cycle counts for 100 speed Baudot lines having one input thereof connected to lead 100, gates 550 through 552 determine cycle counts for 75 speed Baudot lines having one input connected to lead 75 and gates 560 through 562 determine the cycle counts for 60 speed Baudot lines having one input thereof connected to lead 60, the other input lead to these gates being connected by way of multicable 230 to counter section 202 output leads. Gates 536, 543, 553 and 563 determine the appropriate interval for gating the characters in the parallel storage circuits to the recirculating buffer of FIG. 7, for ASA and 100 speed, 75 speed and 60 speed Baudot lines, respectively.

In the initial idle condition with the counter section 202 at the count of 0, all of the above-mentioned gates provide 1 bits at the outputs thereof. Consequently, gates 570 through 572 apply 0 bits to leads 404 through 406, respectively. In addition, inverters 573 through 575 apply 0 bits to leads 406 through 409, respectively. As previously described, leads 404 through 409 are connected by way of multicable 403 to element steering gates 410 through 415. Accordingly, in the initial idle condition, 0 bits are applied to the element steering gates to preclude the steering of the element bits to the parallel storage circuits. In addition, the application of the 1 bits to the inputs of gate 576 produce a 0 bit at the output thereof. Accordingly, a 0 bit is applied to load lead L and inverter 577 normally applies a 1 bit to don't load lead $\overline{L}$.

As previously described, the counter section 202 output leads are selectively connected to gate 530. These leads are connected in such a manner as to provide all 1 bits in response to the advance of counter section 202 to the count of three. This, it is recalled, corresponds to five scanning cycles after sample lead 113 applies the start transition bit to start detector 201 since two additional cycles elapse due to the delay of delay unit 209 in start detector 201 and to the delay of the delay units of counter section 202, such as delay unit 226 in counter stage 210. Since the duration of five scanning cycles is approximately 5 milliseconds, it is apparent that if the addressed line conveys ASA code, the bit corresponding to the approximate midpoint of the start element is being applied to sample lead 113 concurrently with the application of the 1 bits to gate 530 by counter section 202. Accordingly, if an ASA line is being scanned when counter section 202 advances to the count of three, a 1 bit is being applied by way of lead ASA to gate 530 concurrently therewith and a 0 bit is thus provided to the output of gate 530 and thus to the input of gate 570. Therefore, gate 570 applies a 1 bit to lead 404, which, as previously described, extends to one input of element steering gate 410. Accordingly, as previously described, the bit corresponding to the approximate midpoint of the start element of the ASA character is gated from sample lead 113 by inverter 401 and lead 402 through element steering gate 410.

Similarly, when counter section 202 advances to the count of 12, which count corresponds to the approximate midpoint of the first intelligence element, gate 531 applies a 0 bit to gate 571 and gate 571, in turn, applies a 1 bit to lead 405 to enable element steering gate 411. In substantially the same manner, gates 532, 533, 534 and 535 are enabled on the counts 57, 66, 75, and 84, respectively, which counts correspond to the midpoints of the sixth, seventh, and eighth intelligence elements and the first stop element of the ASA code. This results in the application of 1 bits to leads 406 through 409 to successively enable gates 412 through 415 at the approximate element midpoint and concurrent with the sampling of the line.

Gate 536 is enabled when an ASA line is addressed and counter section 202 advances to the count of 85. This is one scan cycle after the stop element has been gated into storage circuit 425 and, at this time, all of the elements of the character appear in parallel at the outputs of the parallel storage circuits. With gate 536 enabled, gate 576 produces a 1 bit at the output thereof which 1 bit is applied to load lead L to load the character into the recirculating buffer of FIG. 7, as described hereinafter. In addition, inverter 577 applies a 0 bit to don't load lead $\overline{L}$ to erase the character from parallel storage circuits, as previously described and to further enable the loading of the character in the recirculation buffer, as described hereinafter. Accordingly, it is thus seen that gates 530 through 536 determine the approximate intervals for enabling the element steering gates 410 through 415 to gate an ASA character into the parallel storage circuits and further load the character into the recirculating buffer in the proper data line time slot.

In a similar manner, gates 540 through 542 enable element steering gates 410 through 412 to load a 100 speed Baudot character into the parallel storage circuits and gate 543 thereafter reads the character into the recirculating buffer. Similarly, these functions are performed by gates 550 through 553 for 75 speed characters and by gates 560 through 563 for 60 speed characters.

RECIRCULATING BUFFER

The recirculating buffer comprises 10 recirculating buffer stages of which stages 700 through 705 are shown, which stages are substantially identical in arrangement.

Considering now stage 700, this stage includes delay unit 728 which unit is identical to delay unit 429 in storage circuit 420 and provides a delay of 1.01 milliseconds. In the initial idle condition, a 1 bit corresponding to each of the scanned lines is being recirculated through buffer stage 700 via delay unit 728. This 1 bit is applied by delay unit 728 to inverter 727 and the resultant 0 bit is applied to gate 723. Gate 723, in turn, thus passes a 1 bit to gate 722, and since lead $\overline{L}$ normally has a 1 bit applied thereto, a 0 bit is applied to inverter 726, which, in turn, applies a 1 bit to delay unit 728. Accordingly, in the initial idle condition, this 1 bit is repeatedly recirculated by buffer stage 700 through delay unit 728. In addition, since the delay of buffer stage 700 is the same as the scanning period, a 1 bit corresponding to each of the data lines are concurrently being recirculated in the stage.

Assuming now that a character has been received, a bit corresponding to the start element appears at the output of storage circuit 420, and translator steering section 203 concurrently provides a load command. Thus a 1 bit is applied to one input of gate 721 by way of lead L and a 0 bit is applied to the other input of gate 721 by way of lead 440. In addition, lead $\overline{L}$ is simultaneously applying a 0 bit to the input of gate 722. Accordingly, the outputs of both gates 721 and 722 are producing 1 bits and inverter 726 is thus applying a 0 bit to delay unit 728. This 0 bit then passes through delay unit to inverter 727 whereby a 1 bit is applied to gate 723. As described hereinafter, lead 760 which comprises the other input to gate 723 normally has a 1 bit applied thereto. Accordingly, gate 723 passes a 0 bit to gate 722 and since lead L again has a 0 bit applied thereto, both gates 721 and 722 pass a 1 bit to inverter 726 which, in turn, applies a 0 bit to delay unit 728. It is thus seen that in response to the command signal from translator steering section 203, buffer stage 700 accepts the 0 bit at the output of storage stage 420 and recirculates the bit through delay unit 728.

Similarly, in stages 701 through 705, the bits at the outputs of the corresponding storage stages are accepted upon the load command from translator steering section 203 and recirculate therein at the scanning period rate. It is noted that the input to buffer 705 comprises lead 445 which, in turn, is connected to the output of storage stage 425. Accordingly, in the event that the scanned line conveys ASA code, the bit applied to buffer stage 705 corresponds to the approximate midpoint of the first stop element. Since the stop element is a mark signal, a 1 bit is passed via lead 445 to stage 705. With lead L applying a 1 bit in response to the load command from the translator, the gate in stage 705 corresponding to gate 721 in stage 700 passes a 0 bit to the inverter corresponding to inverter 726 which, in turn, applies a 1 bit to the delay unit. Thus, a 1 bit is recirculated by stage 705 corresponding to the bit at the approximate midpoint of the first stop element of the scanned ASA line. Similarly, the stages intermediate stages 700 and 705 concurrently recirculate the bits corresponding to the approximate midpoint of eight intelligence elements of the ASA code.

In the same manner, if a Baudot code line is being scanned, the bit corresponding to the approximate midpoint of the stop element is applied to lead 442 by storage stage 422 and thus recirculated in buffer stage 702. Simultaneously therewith and in substantially the same manner, the bits corresponding to the approximate midpoint of the five intelligence elements are recirculated in the buffer stage 701 and the four buffer stages intermediate stages 701 and 702.

The output from buffer stage 700 is derived from the outputs of delay unit 728 and inverter 727 and passed by leads 729 and 730 through multiple cable 751 to the output register in FIG. 6. Similarly, the outputs of buffer stages 701 through 705 are provided at the outputs of delay units and inverters corresponding to delay unit 728 and inverter 727 and passed through similar leads in multiple cable 751 to the output register.

OUTPUT REGISTER

In general, the output register comprises an address portion, generally indicated by block 601, and the character portion, generally indicated by block 602. Character portion 602 includes nine character bit registers of which register 620 through 625 are shown.

Recalling now that recirculating buffer stage 700 provides two outputs thereof, which outputs are applied to leads 729 and 730, it is noted that these latter leads extend to gates 614 and 615 in register 620. Gate 614, in turn, is connected to the set input and gate 615 is connected to the reset input of flip-flop 616. Similarly, the output leads of the other recirculating buffer stages are connected to corresponding gates in the other registers in character portion 602 of the output register.

Flip-flop 616, which is typical of the flip-flops in the several registers, also includes a 1 output lead which lead is driven to the 1 condition when the flip-flop is set and to the 0 condition when the flip-flop is reset and a 0 output lead which is driven to the 1 condition when the flip-flop is reset. In the normal idle condition, flip-flop 616 is in the set state. Thereafter, any application of a o bit to the reset input lead changes the state of flip-flop 616 to the reset condition and the application of a 0 bit to the set input lead then restores flip-flop 616 to the set condition.

With flip-flop 616 normally in the set condition, as previously described, the 1 bit at the set output is applied by way of lead 628 to an input of gate 629, the other input to gate 629 extending by way of lead CL to clock 300. As previously disclosed, clock 300 provides an output bit concurrently with the addressing of each of the data lines. Accordingly, concurrently with the addressing of one of the data lines, gate 629 produces at the output thereof a 0 bit when flip-flop 616 is set, which bit is applied to lead 760 and is inverted by inverter 630 and a 1 bit is then applied to lead 631.

Tracing lead 631, it is noted that this lead provides one input to each of gates 614 and 615 in register stage 620. Tracing lead 760, this lead extends to one input of gate 723. Accordingly, since a sample bit derived from the addressed line concurrently appears at the output of delay unit 728, this bit is applied via lead 729 to gate 614 and the inversion thereof via lead 730 to gate 615 concurrently with the application thereto of the 1 bit via lead 631. In the same manner, the application of a 1 bit to lead 631 enables corresponding gates in registers 621 to 625 to read out in parallel the character in the recirculating buffer.

It is recalled that buffer stage 700 normally recirculates a 1 bit for each of the scanned lines and then, upon reading a start element out of the storage stage 420, recirculates a 0 bit derived from the approximate midpoint of the start element received from the data line. If a 1 bit appears at the output of delay unit 728 when the 1 bit is also applied to lead 631, gate 614 passes a 0 bit to the set input of flip-flop 616. Since flip-flop 616 is normally in the set condition, however, the state of the flip-flop does not change. In the event, however, that a 0 bit appears at the output of delay unit 728, inverter 727 applies a 1 bit via lead 730 to gate 615 when the 1 bit is also applied by lead 631, thereby producing a 0 bit at the output of the gate. Accordingly, a 0 bit is applied to the reset input of flip-flop 616 and the state of the flip-flop is changed to the reset condition indicating the storage of a start element. Similarly, the bit circulating in each of the other buffer stages is passed to the flip-flop in character portion 602 of the output register whereby the corresponding flip-flops are placed in the reset condition in response to the recirculation of a 0 bit to designate a space element and are placed in the set condition in response to a recirculation of a 1 bit to designate the corresponding mark element.

As previously described, when the character in the recirculating buffer is read out by applying a 1 bit to lead 631, a 0 bit is concurrently applied to lead 760 which is connected to gate 723 in buffer stage 700 and to corresponding gates in the other buffer stages. The application of the 0 bit to gate 723 produces a 1 bit at the output thereof. This 1 bit is applied to gate 722 and, since lead $\underline{L}$ normally applies a 1 bit to the other input of gate 722, the gate passes a 0 bit to inverter 726 which, in turn, inserts a 1 bit into delay unit 728. It is thus seen that, upon the read out of buffer stage 700, the 0 bit corresponding to the start element is removed and a 1 bit is then recirculated therethrough. In the same manner, upon the application of a 0 bit to lead 760, 1 bits are recirculated in each of the other buffer stages thus clearing the characters that have been read out from the buffer.

With a character registered in character portion 602, and the start element thereof registered in register 620, flip-flop 616 is reset, as previously described, and the set output lead is driven to the 0 condition. This 0 condition is thus applied via lead 628 to gate 629. Accordingly, gate 629 restores the 1 condition to lead 760 permitting the normal recirculation of the bits in the buffer stages and inverter 630 applies a 0 condition to lead 631 precluding read out of characters in the buffer stages.

Concurrent with the storage of the data character in the flip-flops in registers 620 through 625 in character portion 602, the address of the data line is stored in address portion 601. Address portion 601 comprises nine bit registers of which registers 606, 607, 608, and 609 are shown. Bit register 606, which is typical of the bit registers in address portion 601, includes flip-flop 612 and gates 610 and 611. One input of gates 610 and 611 is connected to lead 631. As previously recalled, a 1 bit is applied to lead 631 when the data line is addressed and the character in the recirculating buffer is read out. The other input leads to gates 610 and 611 extend to double rail output leads 309 which, as previously described, are connected to the ninth stage of counter 315. Accordingly, concurrent with the read out of the recirculating buffer, the ninth digit of the address is applied by way of gates 610 and 611 to flip-flop 612. Similarly, each of the other eight digits of the address are stored in the other bit registers in address portion 601 concurrently with the read out of the recirculating buffer.

The outputs of the flip-flops in character portion 602 and address portion 601 are connected to a storage circuit indicated by block 603. Storage block 603 may comprise any well known type of electronic or magnetic storage device or circuit providing that a reset pulse is provided upon each read out of the flip-flops by storage 603. This reset pulse may be applied as a 0 bit to lead 604; lead 604, in turn, extending the input set lead of flip-flop 616. Accordingly, upon read out of the registered character and address, flip-flop 616 is restored to the normal set condition.

With flip-flop 616 in the set condition, a 1 bit is again applied by way of lead 628 to gate 629 and the register is again enabled to read out characters from the buffer.

Although a specific embodiment of this invention has been shown and described, it will be understood that various modifications may be made without departing from the spirit of this invention and within the scope of the appended claims.

I claim:

1. In a system for scanning a plurality of data signal lines, each of said lines conveying start-stop character elements having a predetermined one of several signaling rates, scanning means for sequentially sampling all of said lines within a scan interval having a duration substantially shorter than the duration of any of said character elements, a plurality of parallel gate circuits, each of said gate circuits associated with one of said elements for gating therethrough samplings of all of said lines of said associated element, and means corresponding to each of said signaling rates and responsive to said scanning means sampling the initiation of a start element on a line conveying said corresponding signaling rate for successively enabling each of said gate circuits at substantially the midpoint of the reception of the element associated therewith and concurrent with the sampling of said line.

2. In a system for scanning a plurality of data signal lines, each of said lines conveying start-stop character elements having a predetermined one of several signaling rates, scanning means for sequentially sampling all of said lines within a scan interval having a duration substantially shorter than the duration of any of said character elements, a plurality of parallel gate circuits, each of said gate circuits associated with one of said elements for gating therethrough samplings of all of said lines of said associated element, means corresponding to each of said signaling rates and responsive to said scanning means sampling the initiation of a start element on a line conveying said corresponding signaling rate for successively enabling each of said gate circuits at substantially the midpoint of the reception of the element associated therewith and concurrent with the sampling of said line, a recirculating storage circuit associated with each of said gate circuits and having a delay equal to said scan interval, means connected to each of said gate circuits for applying said gate element samples to said associated storage circuit, and means responsive to said enabling means and operative after said successive enabling of said gate circuits for simultaneously reading said gated element samples stored in said storage circuits concurrent with the sampling of said line.

3. In a system for scanning a plurality of data signal lines, each of said lines conveying start-stop character elements having a predetermined one of several signaling rates, scanning means for sequentially sampling all of said lines within a scan interval having a duration substantially shorter than the duration of any of said character elements, a plurality of parallel gate circuits, each of said gate circuits associated with one element of said characters for gating therethrough samplings of all of said lines of said associated element, counting means, means responsive to sampling a start element conveyed by any one of said lines for advancing said counter in accordance with each subsequent sampling of said one line, and a group of selecting circuits corresponding to each of said gate circuits, each of said selecting circuits in each of said groups being individual to a signaling rate and selectively responsive to a predetermined advance of said counter and a concurrent sampling of any line conveying elements having said individual signaling rate for enabling the corresponding gate circuit.

4. In a system for scanning a plurality of lines, each of said lines conveying start-stop data characters containing elements with intervals differing from element intervals of characters conveyed by other of said lines, said intervals having a duration substantially equal to an integral multiple of a common basic interval, a plurality of gate circuits, each of said gate circuits associated with one of the elements of said data character, scanning means for consecutively sampling all of said lines within an interval corresponding to said basic interval and applying the samples in parallel to all of said gate circuits, means responsive to scanning of start elements conveyed by any of said lines for determining the theoretical midpoints of elements conveyed by all of said lines, and means responsive to said scanning means for enabling each of said gate circuits concurrently with the sampling of said any line and in accordance with said determination of the midpoint of the element which is associated with said gate circuit and which has a duration corresponding to the element interval of said any line.

5. In a system for scanning a plurality of lines, each of said lines conveying start-stop data characters containing elements with intervals differing from element intervals of other of said line, said intervals having a duration substantially equal to an integral multiple of a common basic interval, a plurality of gate circuits, each of said gate circuits associated with one of the elements of said characters, scanning means for consecutively sampling all of said lines within an interval corresponding to said basic interval and applying the samples in parallel to all of said gate circuits, counting means advanced concurrently with each of said samplings of any one of said lines, means responsive to sampling a start element conveyed by said one line for initiating the operation of said counting means, and a group of selecting circuits associated with each of said character elements, each of said selecting circuits in each of said groups being individual to a predetermined one of said different element intervals and selectively responsive to a predetermined advance of said counter and a concurrent sampling of any line conveying elements with said predetermined one of said intervals for enabling the corresponding one of said gate circuits.

6. In a system for scanning a plurality of lines in accordance with claim 5, a recirculating storage circuit connected to the output of each of said gate circuits, said storage circuit having a recirculating delay equal to the duration of said basic interval, and a further selecting circuit selectively responsive to a further predetermined advance of said counter and a concurrent sampling of said any line for simultaneously reading the samples in all of said storage circuits.

7. In a system for scanning a plurality of lines, each of said lines conveying start-stop data characters containing elements with intervals differing from element intervals of other of said lines, said intervals having a duration substantially equal to an integral multiple of a common basic interval, a plurality of gate circuits, each of said gate circuits associated with one of the elements of said data character, scanning means for consecutively sampling all of said lines within an interval corresponding to said basic interval and applying the samples in parallel to all of said gate circuits, signal producing means responsive to said scanning means for producing signals concurrent with said scanning of each line, pulse generating means responsive to scanning of start elements conveyed by any of said lines for generating pulses concurrent with each subsequent scanning of said any lines, counting means responsive to said pulse generating means for providing counts of said pulses, a plurality of groups of selecting circuits, each of said groups corresponding to an individual one of said element intervals, each of said selecting circuits in said group associated with each of said character elements and selectively responsive to a predetermined count of said counter for enabling the corresponding one of said gate circuits, and means responsive to said signal producing means for enabling said group of selecting circuits corresponding to one of the element intervals when any said line conveying elements having said corresponding intervals is sampled.

8. Character assembling means for assembling in parallel form encoded signals received in serial form from a plurality of character sources and comprising:

a first plurality of N circulating memories each having input means, output means, and in each circulating cycle a plurality of time positions with respect to an arbitrary time reference;

selecting means for connecting the output of any given character source to the inputs of successive one of said N circulating memories at integral multiples of the circulating time of said N circulating memories to store a single bit in each individual one of said N circulating memories at one of said time positions;

said selecting means further constructed to connect the outputs of said character sources other than said given character source to said N circulating memories at different and predetermined ones of said time positions;

time-keeping means comprising a second plurality of M circulating memories each having a plurality of time positions and constructed to respond to the circulation of data in the time positions of said N circulating memories to record separately the number of circulations of each data-containing time position of said N circulating memories; and transferring means for transferring data from any given time position to said output means.

9. Character assembling means in accordance with claim 8 in which:

said time-keeping means is responsive to the initial bit of a word from any of said character sources to initiate the circulation of a pulse in the corresponding time position of said second plurality of circulating memories; and adder means responsive to each circulation of a pulse in the said corresponding time position of one of said second plurality of circulating memories to add a count of 1 to the total count contained in said corresponding time positions of said second plurality of time positions, thereby keeping a record of the total number of circulations of a pulse in said corresponding time position measured form the initial bit of the word being transmitted to said character assembler.

10. Character assembling means in accordance with claim 9 comprising:

time-keeping count decoder means responsive to the count contained in each time position of said second plurality of circulating memories to sample at preselected times successive bits of words being transmitted to said character assembler; and injecting means for injecting said samplings into preselected ones of said first plurality of circulation memories at time positions each of which bears a constant cyclical relation with the sampling time of a given character source.

11. Character assembling means for assembling in parallel form coded signals received in serial form from a plurality of data sources and comprising:

cyclical counting means for sequentially polling said data sources at a rate of P polls per second;

first and second pluralities of circulating memories each having input means, output means, and a circulating time equal to the cycling time of said cyclical counting means;

sampling means for sampling the output signals of said data sources at predetermined times coinciding with preselected polling times and for supplying said samplings into preselected ones of said first plurality of circulating memories at first time positions spaced 1/P seconds apart, with any given time position being unique to a given data source;

time-keeping means including said second plurality of circulating memories and accumulating means responsive to the entering of data in each of said first time positions of said first plurality of circulating memories to maintain a count of the number of circulations of data in said each first time position;

the said second plurality of circulating memories having each of the counts contained therein positioned in a time position having a known and fixed relationship with the time position of the first plurality of circulating memories whose circulating count is being recorded; and means for transferring data from said character assembling means to said output means.